(12) United States Patent
Roman

(10) Patent No.: US 6,401,530 B1
(45) Date of Patent: Jun. 11, 2002

(54) RAIN SENSOR

(75) Inventor: Gianfranco Roman, Pasiano (IT)

(73) Assignee: Claber S.p.A. (IT)

( * ) Notice: Subject to any disclaimer, the term of this patent is extended or adjusted under 35 U.S.C. 154(b) by 0 days.

(21) Appl. No.: 09/506,165

(22) Filed: Feb. 17, 2000

(30) Foreign Application Priority Data

Feb. 23, 1999 (IT) ......................................... MI99A0359

(51) Int. Cl.7 ............................................... G01W 1/00
(52) U.S. Cl. .................................. 73/170.21; 73/170.22
(58) Field of Search ........................... 73/170.17, 170.21, 73/170.22, 170.23, 170.19, 170.08, 170.09, 322.5, 313, 319, DIG. 5; 200/84 C

(56) References Cited

U.S. PATENT DOCUMENTS 2,629,258 A * 2/1953 Northmann et al. ..... 73/170.18
4,557,143 A * 12/1985 Poolin .......................... 73/167
4,644,786 A * 2/1987 Jacobsen et al. ............... 73/171
4,743,717 A 5/1988 Peterson
4,919,165 A 4/1990 Lloyd
4,944,190 A * 7/1990 Scally et al. ............. 73/861.58
5,241,978 A 9/1993 Shaw et al.

FOREIGN PATENT DOCUMENTS

RU 685217 9/1979

* cited by examiner

Primary Examiner—Benjamin R. Fuller
Assistant Examiner—Abdullahi Aw-Musse
(74) Attorney, Agent, or Firm—Akerman Senterfitt

(57) ABSTRACT

A rain sensor is described comprising a tray for the collection of rain water provided on top with evaporation and overflow side windows covered by a perforated cover. A finned float is housed in said tray so as to be able to move vertically as a function of the level of the water present in the tray. A permanent magnet supported by said float cooperates with an electric magneto-sensitive switch that is fixed to the tray in order to switch it between a first and a second electric state as a function of the vertical position of the float.

7 Claims, 7 Drawing Sheets

RAIN SENSOR

FIELD OF THE INVENTION

The present invention concerns a rain sensor, particularly for watering systems.

BACKGROUND OF THE INVENTION

For the maintenance of lawns, gardens, kitchen gardens and other cultivated spaces the use of automatic watering systems controlled by an electronic programmable central unit is increasingly widespread. This allows to guarantee the correct watering also in the absence of the operator of the system, as it usually happens for holiday houses.

Naturally it is completely useless for the central unit to start the watering system during rainy days, when the rain water is more than sufficient to guarantee the cultivations the desired degree of humidity.

Therefore, modern watering systems utilise rain sensors that, when the same rain exceeds a certain pre-established limit, send the central unit an electric signal that is capable to prevent the starting of the system or, if already operating, to control its setting to rest.

A suitable rain sensor must naturally not only be able to collect the rain and to signal the attainment of the pre-established limit but also to reset itself to zero as quick as possible when the rain stops, in order to restore the start of the system and be ready for a correct indication at the following rain. In addition it must guarantee a suitable protection against the introduction of foreign matters that could spoil to the correctness of the measurement and even put it out of use.

SUMMARY OF THE INVENTION

Having considered that, it is an object of the present invention to provide a rain sensor that would offer the maximum guarantees for a good operation.

According to the invention such object has been reached with a rain sensor characterized in that it comprises a tray for the collection of rain water provided on top with side evaporation and overflow windows, a perforated cover placed as a cover of said tray, a finned float housed in said tray so as to be able to move vertically as a function of the level of the water present in the tray, a permanent magnet supported by said float and an electric magneto-sensitive switch that is fixed to the tray and is switchable between a first and a second electric state as a function of the vertical position of the float.

BRIEF DESCRIPTION OF THE DRAWINGS

The characteristics of the present invention will be made evident by the following detailed description of possible embodiments thereof, that are illustrated as non limiting examples in the enclosed drawings, in which.

DETAILED DESCRIPTION OF EMBODIMENTS OF THE INVENTION

Figure 8:
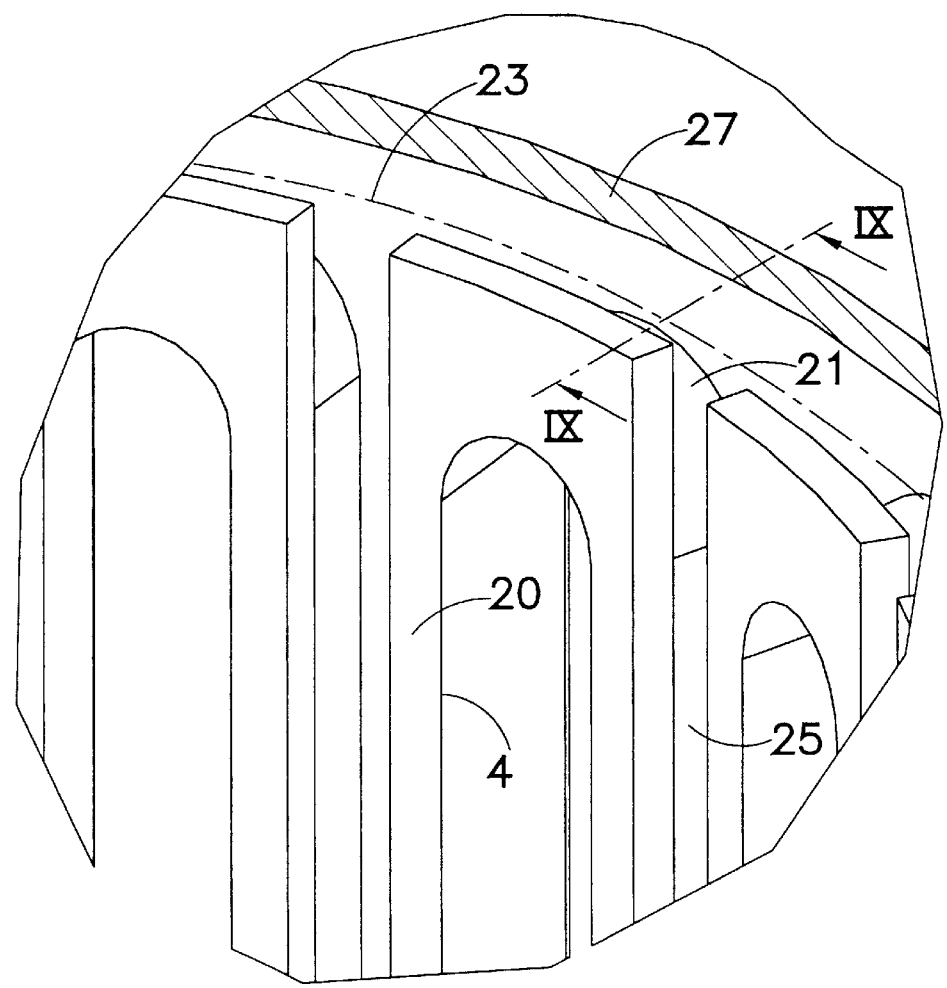
FIG. 8 shows a magnified detail of the support area of the cover on the tray in the rain sensor of the previous figures.

The rain sensor illustrated in the drawings 1–9 comprises a tray 1 for the collection of the water, that is closed at the bottom by a circular plate 2 and is defined sideways by a cylindrical wall 3 with upper extensions 20, distributed circumferentially, that are pierced by airing windows 4, with vertically elongated shape, that radially communicate through links 21 (FIG. 8) with external windows 22 that are in turn uniformly distributed along a circumference that is coaxial with the one of the wall 3 but larger in diameter.

Figure 9:
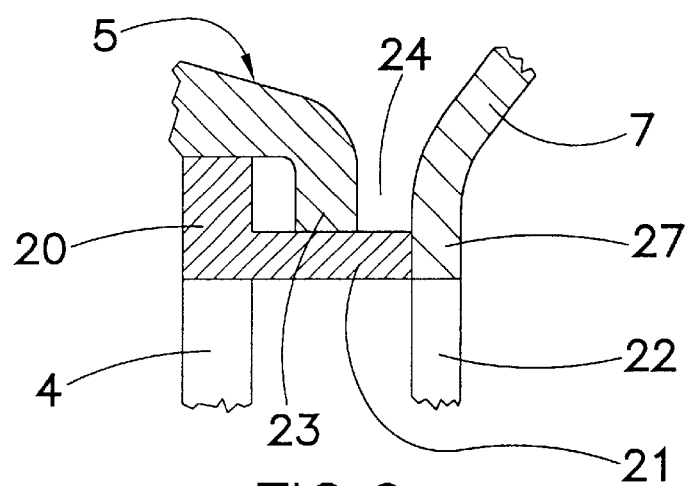
FIG. 9 shows the same detail in section according to line IX—IX of FIG. 8.

Above windows 4, 22 the tray 1 is protected by a cover 5 with cone shape, that is in turn provided with oblong holes 6, that rests with its side edge 23 (schematised with a dash and dot line in FIG. 8) on the links 21 (FIG. 9) and is surrounded by a circular wall 27 with upper flaring 7 in which the external window 22 are made. The cover 5 is provided with a central vertical tip 8.

Inside the tray 1 a round shape float 9 is vertically movably housed, that is made up of a central cylindrical tang 10, of a cylindrical side wall 11 and of an upper wall 12, slightly domed, that is provided with a plurality of radial tabs 13, that are circumferencially spaced in a uniform way.

Inside the float 9, above a bottom plate 14, a permanent magnet 15 is fixed, whose magnetic field influences an electric magneto-sensitive switch 16 that is electrically connectable with a control unit for watering system by means of electric conductors 17 that extend out through a slot 18.

Figure 1:
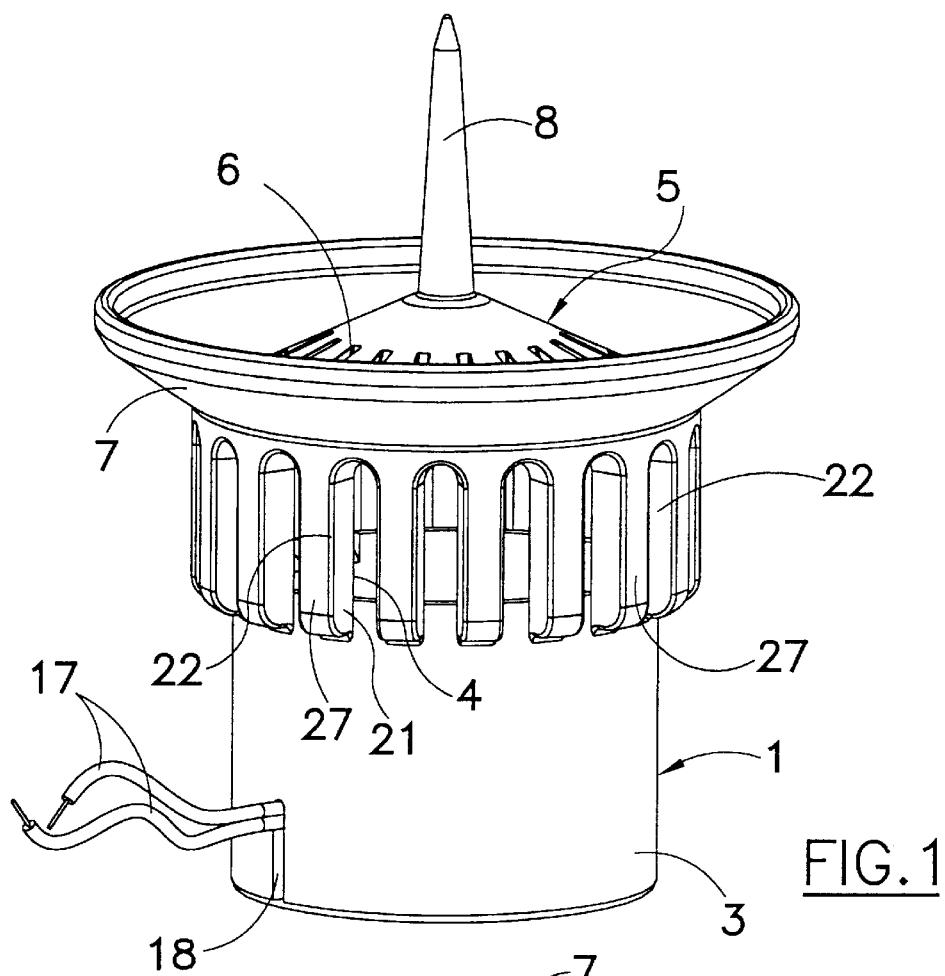
FIG. 1 shows a rain sensor according to a first embodiment of the present invention in a perspective view.
Figure 2:
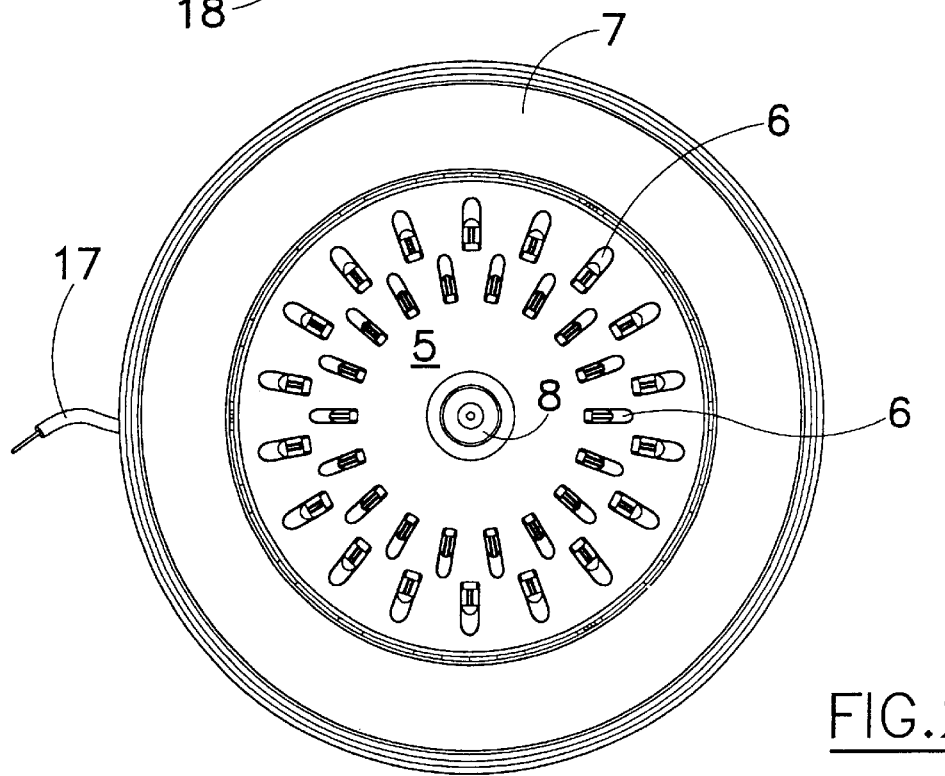
FIG. 2 shows said rain sensor in a top plan.
Figure 3:
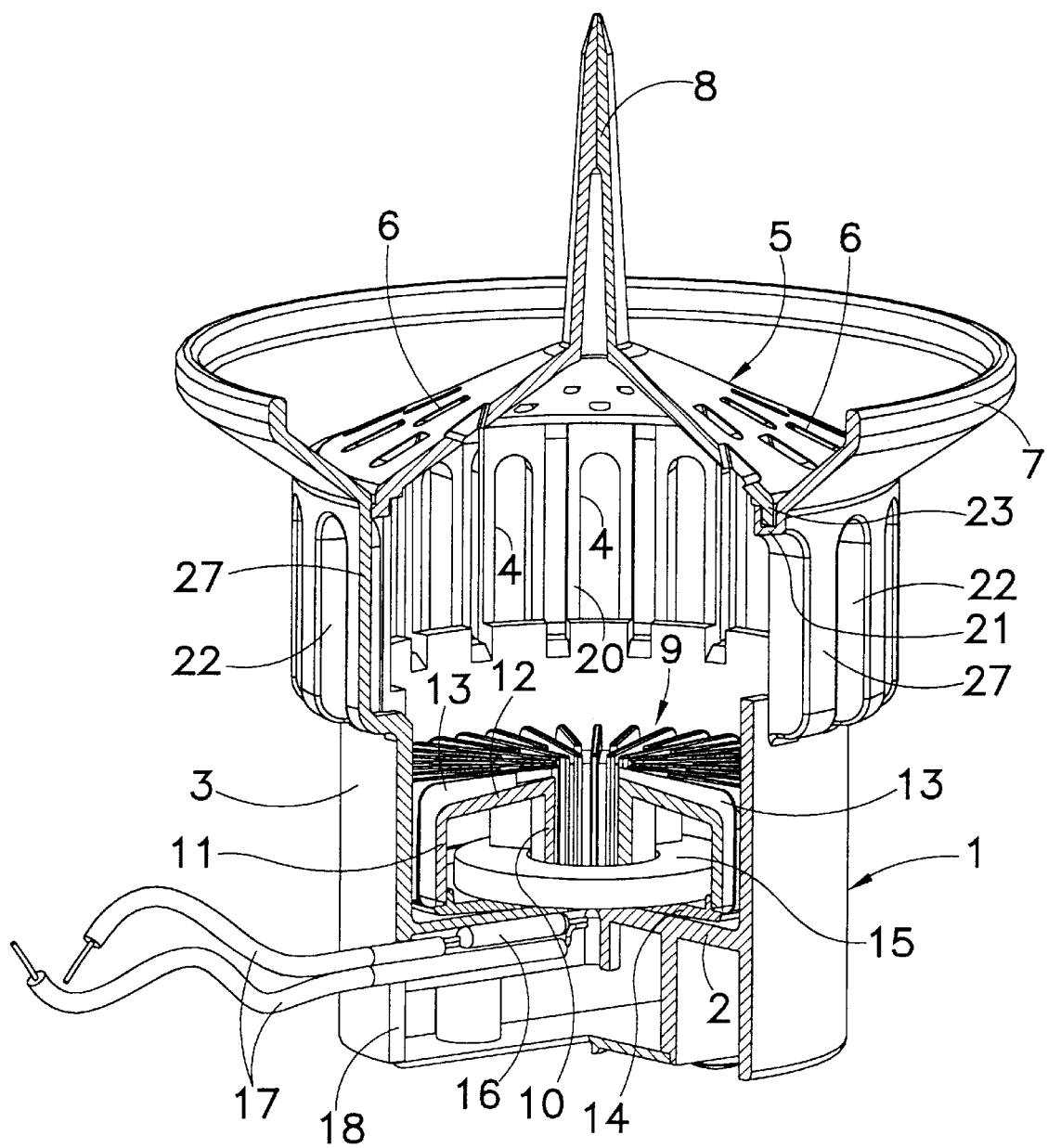
FIG. 3 shows said rain sensor in a partially sectioned perspective view, in condition of absence of rain.
Figure 4:
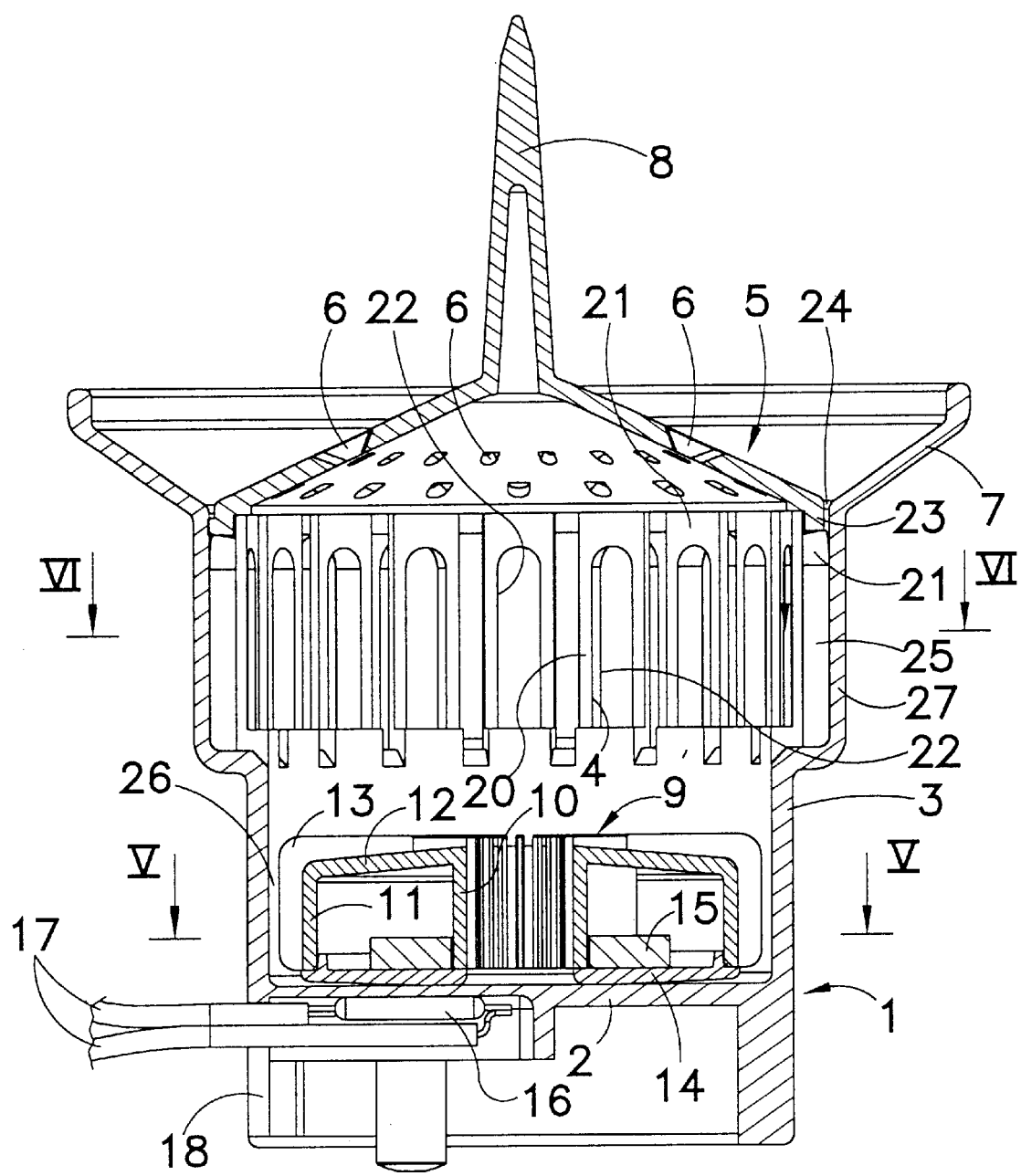
FIG. 4 shows said rain sensor as sectioned according to a vertical plane, still in the absence of rain.
Figure 5:
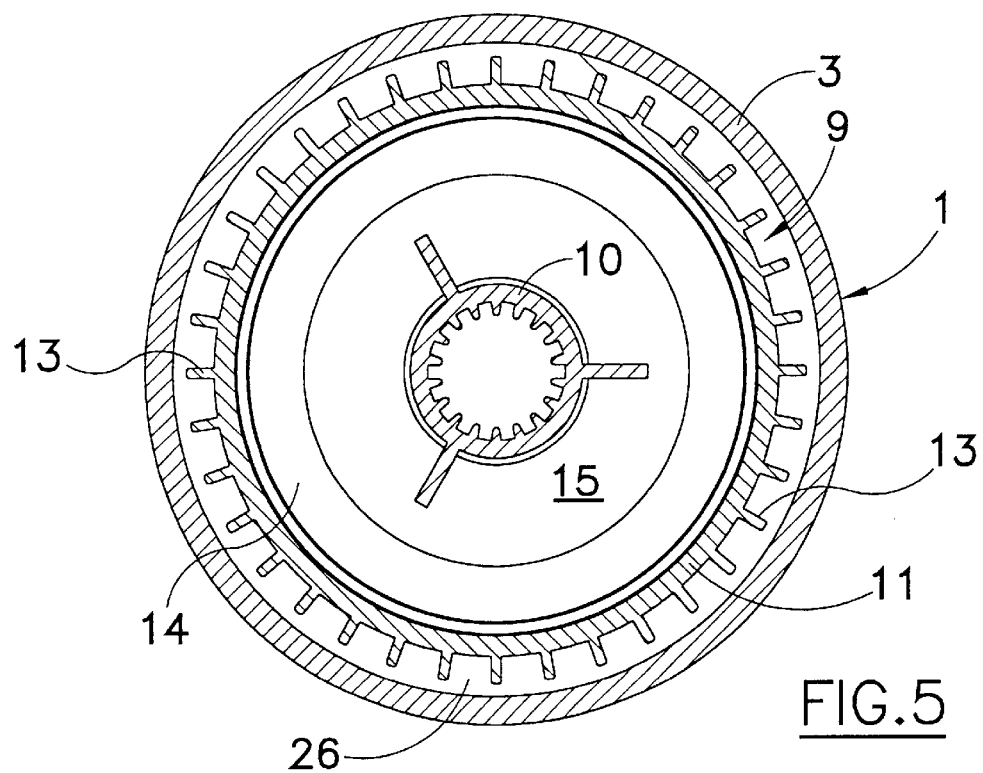
FIG. 5 shows said sensor as sectioned according to a horizontal plane passing through V—V line of FIG. 4.
Figure 6:
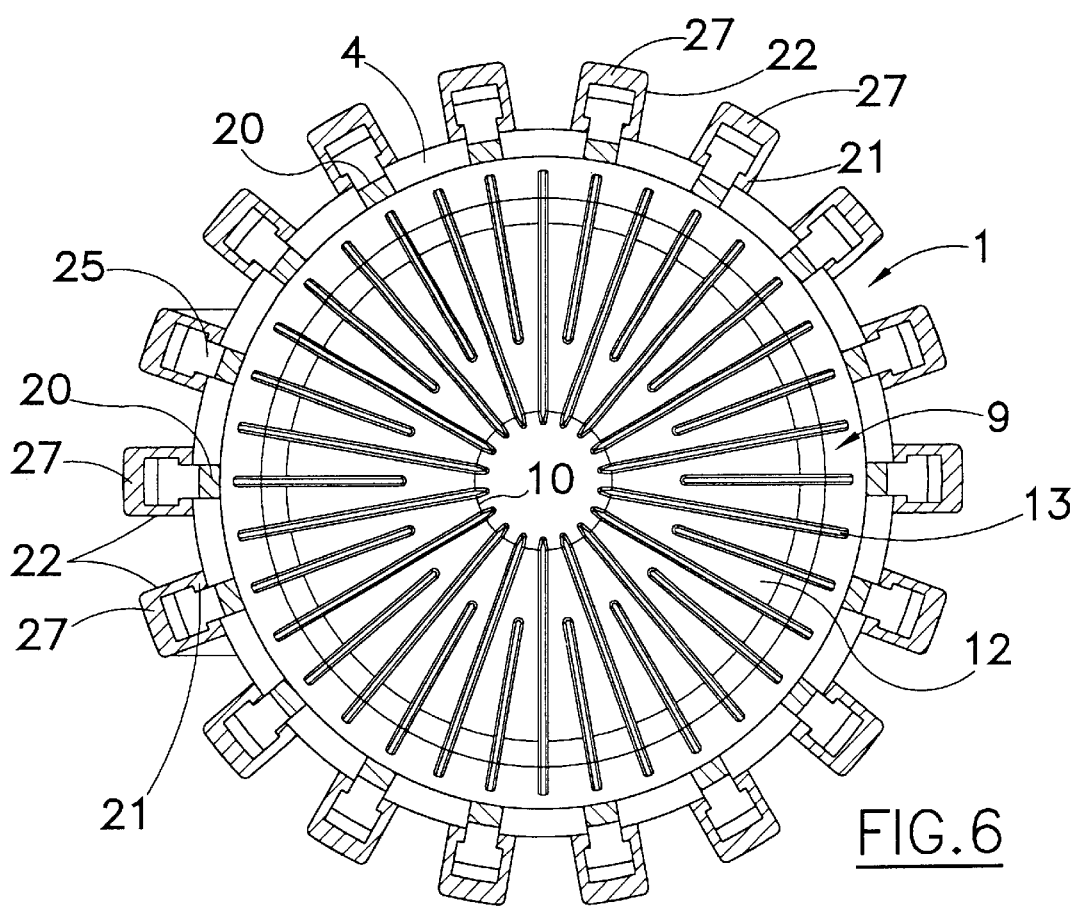
FIG. 6 shows said sensor as sectioned according to a horizontal plane passing through VI—VI line of FIG. 4.

During the operation, in the absence of rain the float 9 rests on the bottom of the tray 1 (FIGS. 3 and 4) and the magnetic field of the magnet 15 keeps the switch 16 in a state of closed contact that translates into an appropriate consent signal for the central unit. In this condition the cover 5 protects the tray 1 against the intrusion of foreign matters and its tip 8 keeps birds and other animals distant.

Figure 7:
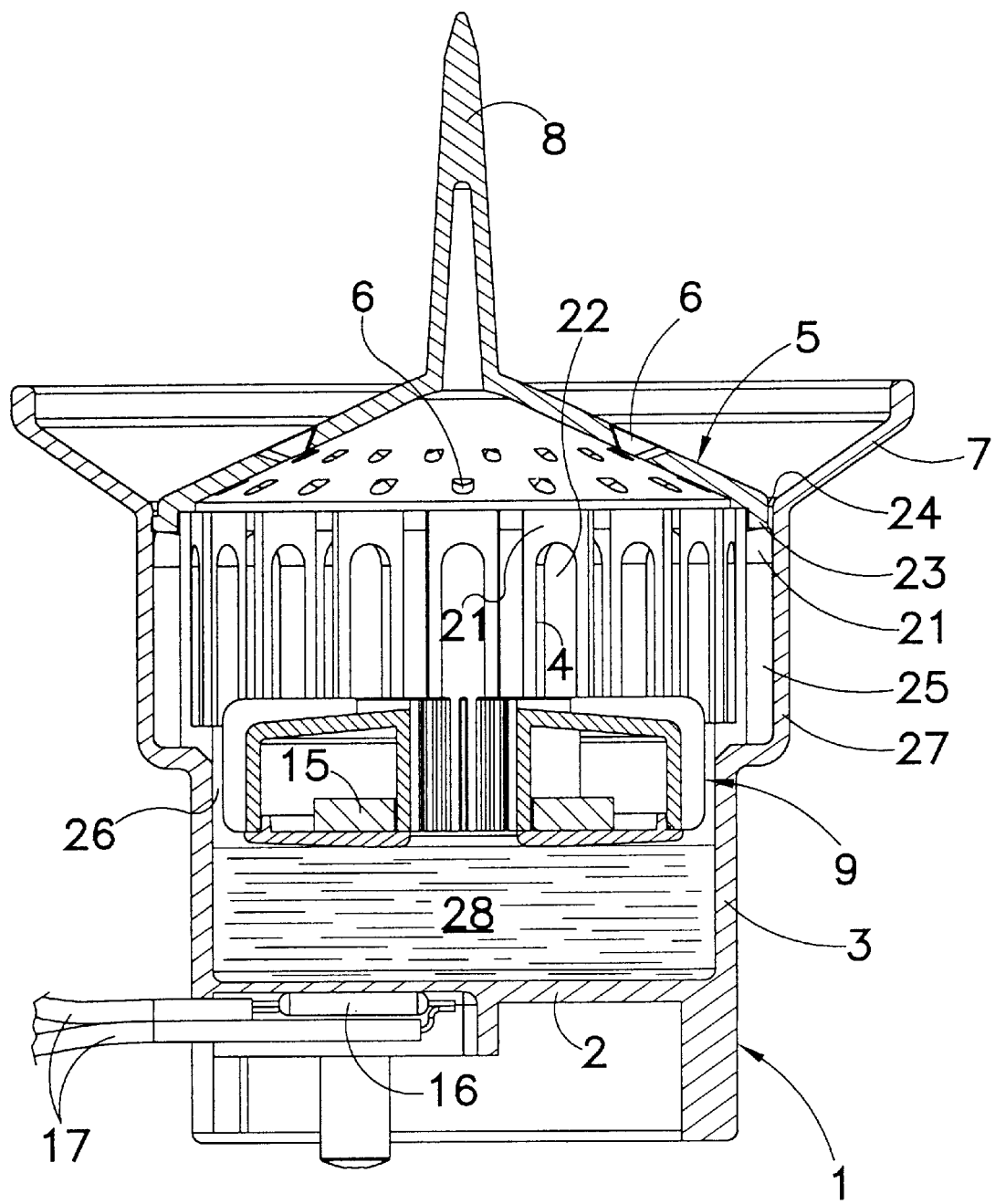
FIG. 7 shows said sensor as sectioned vertically as in FIG. 4 but in the presence of rain.

In case of rain, the rain water 28 passes through the holes 6 of the cover 5, as also through the interstice 24 between the side edge 23 of the cover 5 and the passages 25 between the links 21 and between the extensions 20 of the wall 3, and it penetrates inside the tray 1, first on the float 9 and then, flowing on the upper wall 12 of the same float and passing through the interstice 26 between its side wall 11 and the side wall 3 of the tray 1, on the bottom plate 2 of the tray 1 and below the float 9, that as a consequence moves vertically along the axis of the tray (FIG. 7).

When the float 9 reaches a pre-established vertical position, corresponding to a pre-established level of water in the tray 1, the magnetic field of the magnet 15 stops affecting the switch 16, that as a consequence switches in a state of open contact that induces the central unit to turn the watering system off. The possible excess of rain causes the overflow of the exceeding water through the windows 4, 22.

Once the rain is over, the water that has been collected in the tray 1 starts to evaporate through the airing windows 4, 22 favoured in that by the tabs 13 provided on the float 9. As a consequence the latter starts to redescend until it causes again the closing of the switch 16 through the magnet 15 and the consequent consent to the restarting of the watering system.

The wide airing surface assured by the windows 4, 22 and the abundant finning 13 of the float favour and make the restoration of the operating condition quick. The dimensions of the tray 1 can adequately be selected so that the float 9 determines the opening of the switch 16 for a quantity of rain water equal to 5 liters per square meter, that is equal to 5 mm for m$^2$.

Figure 10:
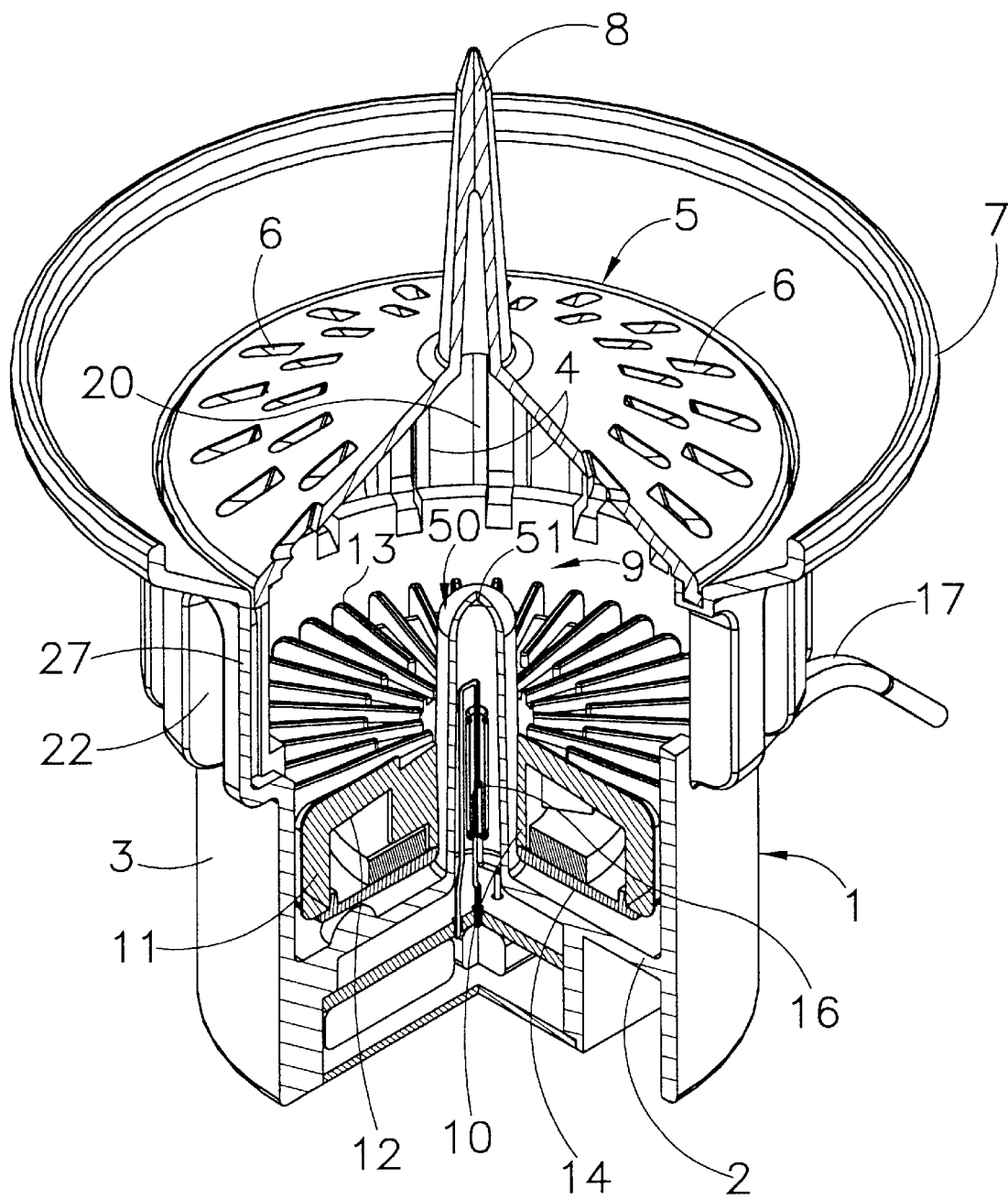
FIG. 10 shows a rain sensor according a second embodiment of the present invention in a partially sectioned perspective view, in condition of absence of rain.

FIG. 10 shows a rain sensor according a second embodiment of the present invention, which differs from the rain sensor of the first embodiment only because the electric magneto-sensitive switch 16 is differently placed. In fact this switch 16 is placed inside a cylindrical post 50 formed by a vertical central extension of the lower plate 2 of the tray 1 and provided by an upper tip 51 to skid water in the tray 1. In this way this switch 16, which is perpendicular to magnet, is more sensitive to the variations of the magnet height.

What is claimed is:

1. A rain sensor, comprising:

a tray for the collection of water having evaporation and overflow side windows, and a perforated cover;

a finned float housed in the tray so as to be able to move vertically as a function of a level of water present in the tray;

a permanent magnet supported by said float;

an electro magneto-sensitive switch that is fixed to the tray and is switchable between a first and a second electric state as a function of a vertical position of said float; and airing windows having internal windows made in upper extensions of a side wall of the tray and radially communicating with external windows made in an external side wall with upper flaring.

2. The rain sensor according to claim 1, wherein said float has a slightly dome shaped upper wall.

3. The rain sensor according to claim 1, wherein said cover is provided with a central tip which extends vertically upward.

4. The rain sensor according to claim 1, wherein said windows communicate with each other through links on which a side edge of said cover rests.

5. The rain sensor according to claim 4, wherein between said side edge of the cover and said external side wall an interstice communicating with the interior of the tray through passages between said links and between said upper extensions is left.

6. The rain sensor according to claim 1, wherein said electric magneto-sensitive switch is placed horizontally under said magnet.

7. The rain sensor according to claim 1, wherein said electric magneto-sensitive switch is placed in a vertical cylindrical post which is substantially at the center of the tray and extends through said magnet.

\* \* \* \* \*